United States Patent
Reichert et al.

(10) Patent No.: US 10,214,282 B2
(45) Date of Patent: Feb. 26, 2019

(54) FLOAT DUCTS AND FLOOR PANEL

(71) Applicant: Kitty Hawk Corporation, Mountain View, CA (US)

(72) Inventors: Todd Reichert, Mountain View, CA (US); Cameron Robertson, San Mateo, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 230 days.

(21) Appl. No.: 15/247,432

(22) Filed: Aug. 25, 2016

(65) Prior Publication Data
US 2018/0057152 A1 Mar. 1, 2018

(51) Int. Cl.
| | |
|---|---|
| *B64C 25/54* | (2006.01) |
| *B64C 27/08* | (2006.01) |
| *B64C 1/00* | (2006.01) |
| *B64D 27/24* | (2006.01) |

(52) U.S. Cl.
CPC ............ *B64C 25/54* (2013.01); *B64C 1/0009* (2013.01); *B64C 27/08* (2013.01); *B64D 27/24* (2013.01)

(58) Field of Classification Search
CPC ......... B64C 25/54; B64C 27/08; B64C 27/20; B64C 21/04; B64C 21/08; B64C 17/00; B64C 1/18; F15D 1/004
See application file for complete search history.

(56) References Cited

U.S. PATENT DOCUMENTS

| | | | | |
|---|---|---|---|---|
| 3,507,466 A * | 4/1970 | La Fleur | ................ | B64C 25/56 244/100 A |
| 4,296,899 A | 10/1981 | Isenberg | | |
| 4,799,633 A | 1/1989 | Lahti et al. | | |
| 5,368,258 A | 11/1994 | Johnson et al. | | |
| 5,706,651 A | 1/1998 | Lillibridge et al. | | |
| 6,254,032 B1 * | 7/2001 | Bucher | ............... | B64C 29/0033 244/12.2 |
| 7,946,526 B2 * | 5/2011 | Zimet | ..................... | B64C 27/10 244/17.19 |
| 9,004,973 B2 * | 4/2015 | Condon | ................. | A63H 13/00 446/37 |
| 9,457,900 B1 * | 10/2016 | Jones | ...................... | B64C 39/02 |
| 2002/0113169 A1 * | 8/2002 | To | .......................... | B64C 25/54 244/130 |
| 2002/0125368 A1 * | 9/2002 | Phelps, III | .............. | B64C 27/10 244/17.23 |
| 2013/0075538 A1 * | 3/2013 | Wiplinger | ............... | B64C 25/54 244/218 |
| 2014/0175214 A1 * | 6/2014 | Lundgren | .............. | B64D 47/08 244/17.23 |
| 2014/0252165 A1 * | 9/2014 | Smith | ..................... | B64C 25/54 244/105 |
| 2015/0360758 A1 * | 12/2015 | Rivault | ..................... | B63B 7/06 114/360 |
| 2016/0311528 A1 * | 10/2016 | Nemovi | .................. | B64C 27/82 |

(Continued)

*Primary Examiner* — Timothy D Collins
*Assistant Examiner* — Tye William Abell
(74) *Attorney, Agent, or Firm* — Van Pelt, Yi & James LLP

(57) ABSTRACT

An aircraft includes a float which provides buoyancy when the aircraft floats on a surface of water. The aircraft also includes a rotor where the rotor is configured to rotate in a horizontal plane and blow a wake across a side of the float. The rotor and the float are positioned relative to each other such that there is no aerodynamic separation between the wake blown by the rotor and the side of the float.

9 Claims, 9 Drawing Sheets

(56) References Cited

U.S. PATENT DOCUMENTS

2017/0183088 A1* 6/2017 Du .................... B64C 25/06
2017/0253333 A1* 9/2017 Baudet ............... B64C 39/024
2018/0002001 A1* 1/2018 Daniel, Sr. .......... B64C 25/54

* cited by examiner

US 10,214,282 B2

FLOAT DUCTS AND FLOOR PANEL

BACKGROUND OF THE INVENTION

Seaplanes and amphibious helicopters, which can take off and land over water, have been provided. New types of overwater aircraft which offer advantages over seaplanes traditional helicopters are being developed. These aircraft may have rotors oriented like a helicopter and are therefore able to take off and land vertically. It may be desirable for such aircraft to have the ability to take off and land in a relatively smaller body of water (e.g., whereas a seaplane needs to taxi along the surface of the water, which requires a larger body of water) without the complexity and expense associated with a traditional amphibious helicopter. Techniques which improve the operational efficiency of such aircraft would be desirable because power would be conserved.

BRIEF DESCRIPTION OF THE DRAWINGS

Various embodiments of the invention are disclosed in the following detailed description and the accompanying drawings.

DETAILED DESCRIPTION

Figure 1A:
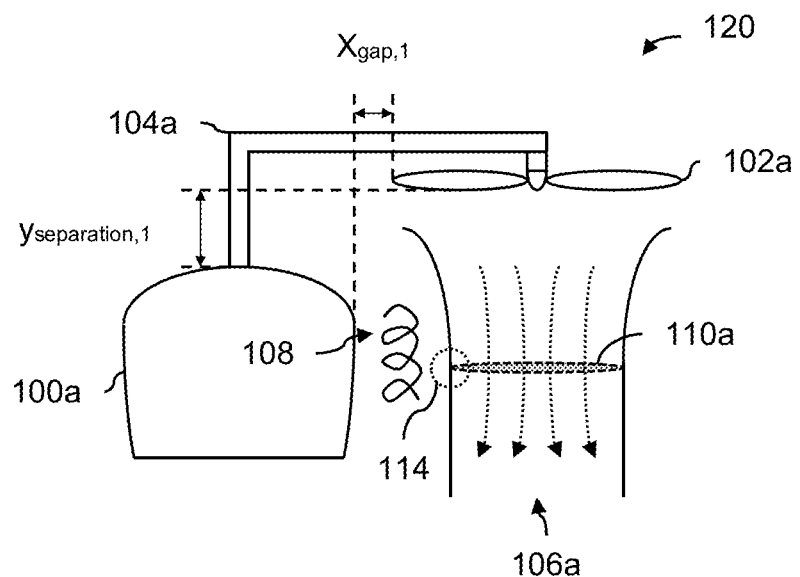
FIG. 1A is a diagram illustrating two examples of overwater aircraft: one where the float acts as a duct and another where the float does not.
Figure 1A:
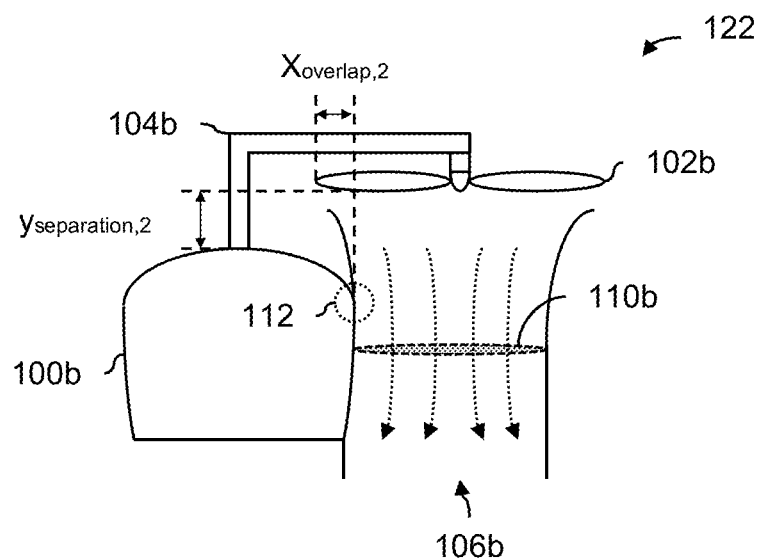

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of an aircraft are described herein where one or more floats of the aircraft act like a duct. A float provides buoyancy when the aircraft floats on the surface of water (e.g., the aircraft is an overwater aircraft which takes off and lands on water). In some embodiments, the rotor is positioned relative to the float such that the rotor and the float overlap in the horizontal direction and also have a separation in the vertical direction (e.g., the rotor hangs over the float). In other embodiments, the rotor is adjacent to and very close to the side of the float. The rotor rotates in the horizontal plane (e.g., like a helicopter rotor) and blows air across the side of the float. The relative position of the rotor and float are selected so that there is no (e.g., aerodynamic) separation between the side of the float (e.g., across which air is blown by the rotor) and flow remains attached along the side of the float. To put it another way, an outer region, adjacent to the side of the float, of a wake blown by the rotor remains attached to the side of the float.

FIG. 1A is a diagram illustrating two examples of overwater aircraft: one where the float acts as a duct and another where the float does not. In both diagrams, the float and the rotor are from an overwater aircraft (i.e., which takes off and lands over water). As such, float 100a and float 100b may be filled with air in order to provide enough buoyancy so that the aircraft can float on water.

Diagram 120 shows an example of a float which does not act like a duct. In that example, downward facing rotor 102a is held in position by arm 104a (or, more generally, a support) which is connected to float 100a at one end and rotor 102a at the other end. Rotor 102a is referred to as a downward facing rotor because the arm (more specifically, the portion that extends horizontally outward from the aircraft) is above the rotor (102a) and does not come between the rotor and the top of the float. In some embodiments, a downward facing rotor is attractive because there is less aerodynamic downloading on the boom (e.g., the exemplary aircraft needs lift to fly, and the wake produced by the rotor would push down on any arm between the rotor and the float). In this diagram, the dimensions of the support are such that the rotor is positioned relatively high above the float (e.g., $y_{separation,1}$ is a foot or more and there is no overlap in the horizontal direction (e.g., $x_{gap,1}$ is a positive value).

In this example, the rotors are oriented like a helicopter rotor (e.g., with the rotor configured to rotate in a horizontal plane). When the rotor (102a) is on, a funnel of air (sometimes referred to as a wake) (106a) is produced. As shown here, the air in the wake is an exhaust or output wake pattern (e.g., caused by the rotor). The air in wake 106a is orderly and/or organized with all of the air flowing in the same direction (e.g., the wake is laminar-like with parallel layers/flows and little or no mixing between the parallel layers/flows). In the example of diagram 120, the relative positions of the float and rotor (e.g., the "too high" vertical separation and the lack of horizontal overlap) causes a (e.g., aerodynamic) separation (108) between the float (100a) and the wake (106a). For example, instead of the orderly flow of air in wake 106a, the air in separation 108 is disorganized and/or chaotic (e.g., separation 108 has a turbulent flow and/or has eddies).

Diagram 122 shows an example of an overwater aircraft where the float acts as a duct. In this example, the dimensions of arm 104b are slightly different from arm 104a. More specifically, there is less vertical separation between rotor 102b and float 100b (i.e., $y_{separation,1} > y_{separation,2}$) and the rotor overlaps in the horizontal direction with the float (e.g., as opposed to diagram 120 where there is a gap between the rotor and the float in the horizontal direction). For example, $y_{separation,2}$ may be on the order of 2-4 inches and $x_{overlap,2}$ may be on the order of 2-4 inches. In this example, the rotor has a 34 inch diameter. For other rotor dimensions, everything would scale proportionally (e.g., for a larger rotor, there would be more vertical separation and more horizontal overlap with the dimensions scaling proportionally to those shown in diagram 122).

As a result of the relative positions of the rotor and float in diagram 122, there is no separation between the side of the float (100b) and the wake produced (106b). The wake adheres all the way down the side of the float, up to and including the bottom corner of the float, such that there is no separation anywhere along the side of the float. The edge of the funnel of air (106b) adheres to or is otherwise attracted to the side of the float such that the cross sectional area of the funnel is increased. For example, suppose that the blade size and rotational speed of the rotors are the same between diagram 120 and diagram 122. If the cross sectional areas of the two wakes were measured, cross sectional area 110b in diagram 122 would be larger than cross sectional area 110a in diagram 120. Cross sectional area 110a and 110b correspond to each other in the sense that they are both measured from the point at which the outer edge of the wake stops contracting or otherwise curving inward and begins a path straight down. However, in diagram 122, the inner edge of the wake is stopped from curving inward at point 112 whereas in diagram 120, the float does not "intervene" to stop the inward curvature of the inner edge (e.g., before the inner edge straightens out on its own at point 114). This causes cross sectional area 110b to be greater than cross sectional area 110a.

In aerodynamics, a duct (e.g., which is typically a pipe or tube where the air flows in the pipe) acts to reduce the amount of contraction in the wake. Thus, the deliberate arrangement of the float and the rotor in diagram 122 has the same effect of expanding the cross sectional area of the wake. The term "float duct" is therefore sometimes used to refer to a float which acts like a duct (e.g., to expand the cross sectional area of an adjacent wake).

To induce a duct effect, a float duct and a rotor are (e.g., deliberately) positioned to have a certain relative position (e.g., which falls into some range of acceptable vertical separation and/or some range of acceptable horizontal overlap, at least according to the embodiment shown in diagram 122). Generally speaking, there is some "happy medium" range (or, more generally, acceptable range) for the vertical separation as well as the horizontal overlap. For example, if there is too much horizontal overlap, some of the air from the rotor will bounce off the top of the float, reducing the cross sectional area of the wake. If there is too little overlap, then the distance between the wake and the side edge of the float will be too great for the wake to be attracted to the side edge of the float, both eliminating any separation and expanding the cross sectional area of the wake. Similarly, too much or too little vertical separation will not cause the float to act like a duct.

Figure 1B:
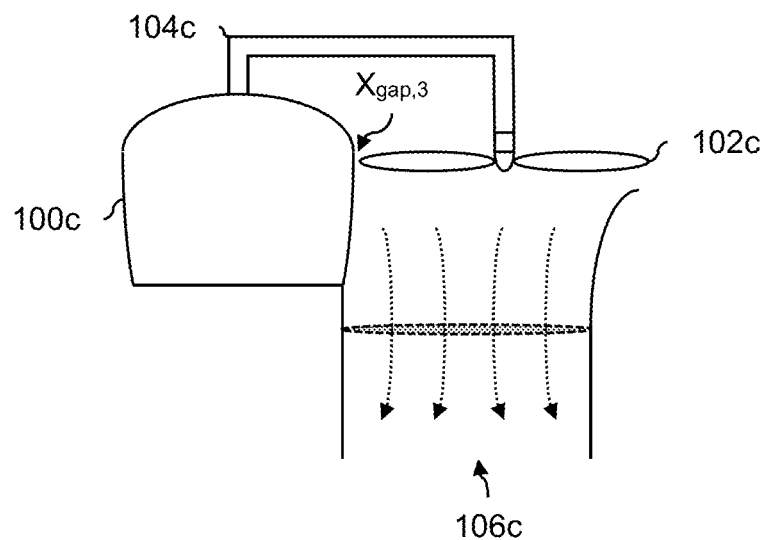
FIG. 1B shows an embodiment of an overwater aircraft where the rotor is adjacent to the duct float.

FIG. 1B shows an embodiment of an overwater aircraft where the rotor is adjacent to the duct float. In this example, the arm (104c) has positioned the rotor (102c) so that it is adjacent to the float (100c). There is a relatively narrow gap between the rotor and the float (e.g., $x_{gap,3}$ may be in the range of 0.1-10 mm). In this example, the float acts to immediately stop the contraction of the inner edge of the wake as soon as the wake (106c) forms. For example, whereas the inner edge of wake 106b has some space to start curving inward before the side of float 100b is encountered, the top of wake 106c immediate encounters the side of float 100c, so there is no space for the inner edge of the wake to begin contracting or otherwise curving inward. It is noted that the relative heights of the rotor and the float do not matter as much in this configuration and therefore no vertical separation is shown or otherwise discussed in regards to this diagram.

In some applications, the embodiment shown in diagram 122 of FIG. 1A is more attractive than the embodiment shown in FIG. 1B. For example, because the gap $x_{gap,3}$ is relatively small, the rotor (102c) and float (100c) might collide, causing the blade(s) of the rotor to shatter and/or the float to be punctured (e.g., depending upon what materials are used). In applications where either could happen, it may be desirable to use the embodiment shown in diagram 122 of FIG. 1A.

In some embodiments, multiple positions or placements of the rotor and float are tested in order to determine proper or desired ones. For example, visible airborne particles (e.g., a powder or some dye) may be blown through the rotors so that that the funnel of air and any separation between the funnel of air and the float are visible. Positions which produce no separation and maximize the cross sectional area of the wake are then found by (e.g., independently) adjusting the vertical separation and horizontal overlap.

In some embodiments, the float has a particular shape to help the float act like a duct. Some example shape characteristics are discussed in more detail below.

One benefit to a float duct is that the expansion of the cross sectional area of the wake increases the (e.g., aerodynamic) efficiency of the system. Since the wake generated by the rotors is used to provide lift, less power is consumed in order to achieve a certain amount of wake or a certain amount of lift. This is because it is easier to force air through a larger cross section than a smaller cross section. For example, more power is consumed by diagram 120 in FIG. 1A (where the float does not act like a duct) compared to diagram 122 in FIG. 1A (where the float does act like a duct). Measured in terms of power consumption, a properly placed float duct may reduce power consumption by ~10-20%, which is desirable.

In some embodiments, the aircraft is a battery powered aircraft. It may be especially desirable with a battery powered aircraft to conserve power because the amount of time required to charge a battery (i.e., charging time) is not negligible. Therefore, even small improvements in power conservation may be especially desirable for battery powered aircraft.

In some embodiments, the rotor is attached at a fixed angle or fixed position to the aircraft. That is, the rotors in such embodiments cannot be tilted or moved. This means that the aircraft cannot be maneuvered during flight by tilting the angle of the rotors (e.g., using some tilting and/or moving mechanical mechanism between the rotor and the arm). Rather, specific rotors are selectively rotated faster or slower (or, more generally, the rotational speed of a given rotor is adjusted) so that there are different amounts of vertical lift provided by the different rotors. This permits the aircraft to (for example) tilt forward, back, left, or right. Since the rotor will always be blowing air across the side of the float, a float duct may be especially useful for aircraft with fixed-position rotors. If the wake is always blowing across the side of the float (e.g., because the rotors have a fixed position and cannot be tilted) then the duct effect induced by a properly positioned float duct will always be present and thus will always benefit the aircraft.

The above figures show partial views of exemplary aircraft. The following figures show more complete examples of overwater aircraft with a float duct.

Figure 2A:
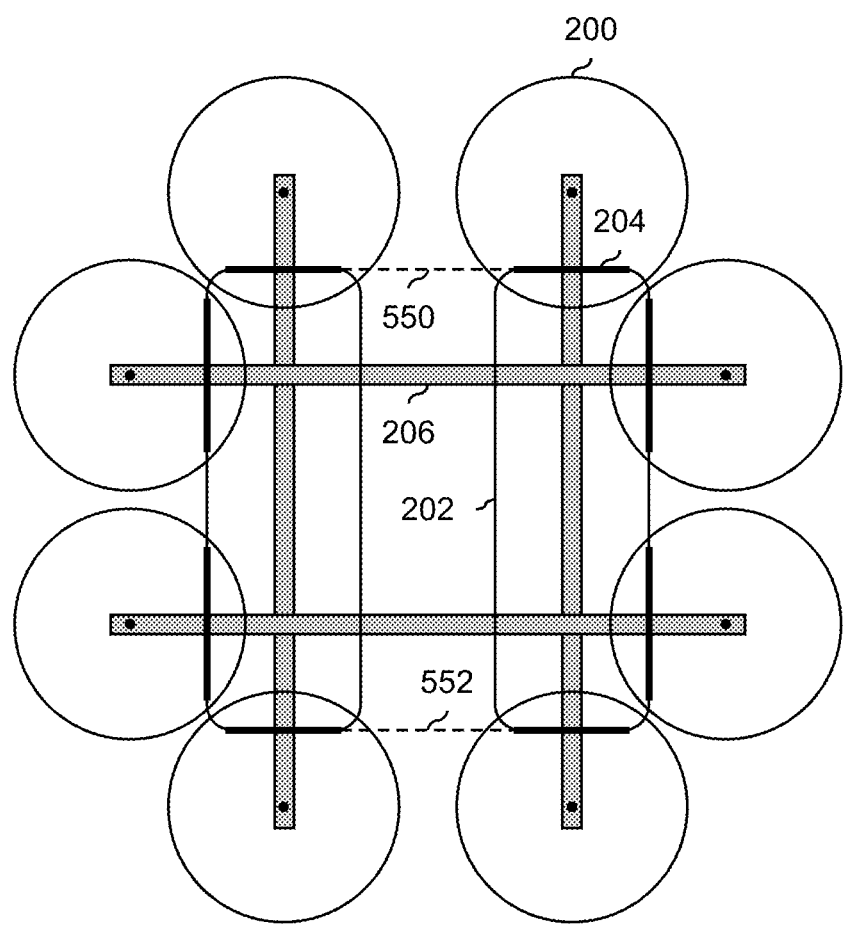
FIG. 2A is a diagram illustrating an embodiment of an octocopter with two floats and eight float ducts.

FIG. 2A is a diagram illustrating an embodiment of an octocopter with two floats and eight float ducts. In this example, a top view of the exemplary octocopter is shown. The eight rotors are mounted to a network of crossbeams (206): two running vertically and two running horizontally. The crossbeams are also used to connect and secure other components of the octocopter to each other, including the floats. For clarity, other components (such as batteries, motors, a seat for the pilot, etc.) are not shown.

In this example, the eight rotors (200) are connected to the crossbeams and are positioned such that the vertical separation and horizontal overlap (not shown) between the floats (202) and rotors (200) causes the floats shown to act like ducts. To illustrate (generally) what side portions of the floats act like ducts for adjacent rotors, such sides are shown with a thicker line (see, e.g., line 204). This overwater aircraft is merely exemplary and a float duct may be used by any type of aircraft.

The following figures shows similar octocopters but with additional features or elements to further improve the duct-like effect.

Figure 2B:
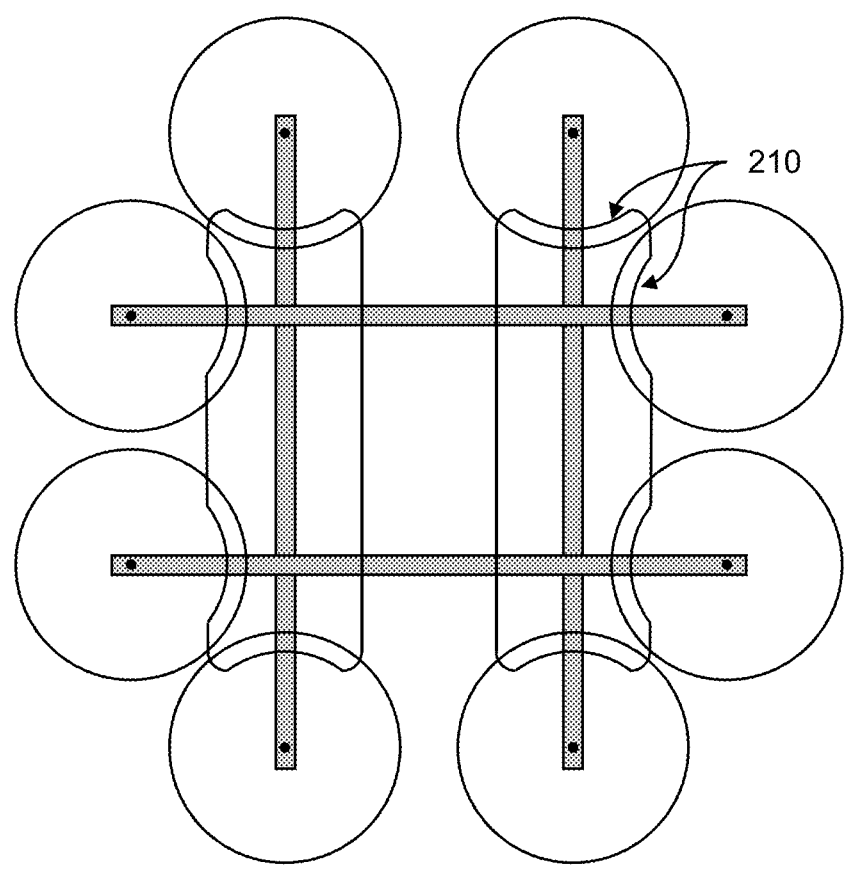
FIG. 2B is a diagram illustrating an embodiment of an octocopter with float ducts where portions of the side are concave.

FIG. 2B is a diagram illustrating an embodiment of an octocopter with float ducts where portions of the side are concave. In this example, the sides of the floats include concave portions (210) which follow the curve of the rotors. This increases the surface area adjacent to the rotors, increasing the duct-like effect. In some embodiments, this configuration is attractive because when the octocopter is in forward flight, there is no additional or extra protrusion laterally or sideways which increases the wind resistance during forward flight (e.g., compared to the embodiment shown in FIG. 2A).

Figure 2C:
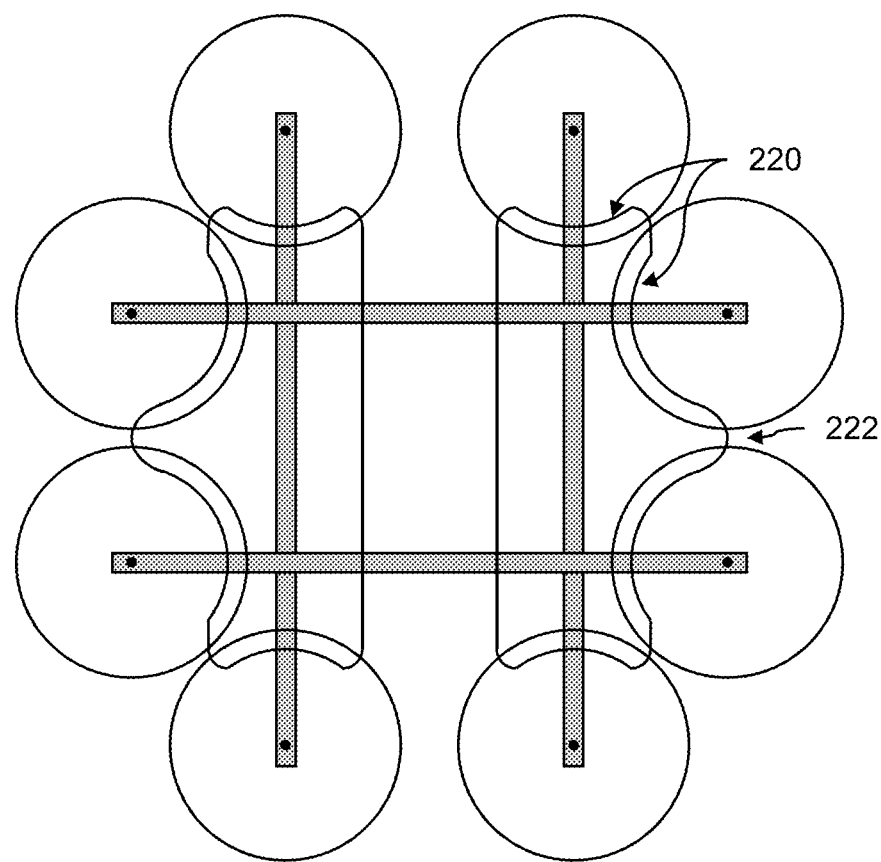
FIG. 2C is a diagram illustrating an embodiment of an octocopter with float ducts where some parts of the side are concave and some parts are convex.

FIG. 2C is a diagram illustrating an embodiment of an octocopter with float ducts where some parts of the side are concave and some parts are convex. In this example, the sides of the floats include concave portions (220) as well as convex portions (222) which follow the curve of the rotors. This (further) increases the surface area adjacent to the rotors, (further) increasing the duct-like effect. The figure is not necessarily to scale and the degree to which the convex portion extends out sideways may be smaller than shown (e.g., so that wind resistance during forward flight increases only a relatively small amount).

As described above, a float may have a particular shape or cross section to help the float act like a duct. The following figure discusses some features of an exemplary float duct cross section.

Figure 3:
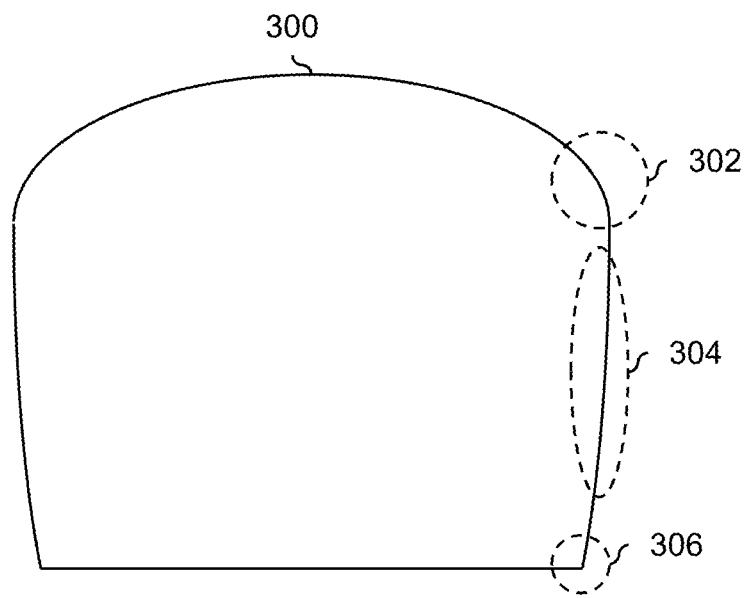
FIG. 3 is a diagram illustrating a cross section of an embodiment of a float duct.

FIG. 3 is a diagram illustrating a cross section of an embodiment of a float duct. In the example shown, the cross section (300) of the exemplary float duct may be described (e.g., conceptually) like a loaf of bread: rounded at the top with sharper corners at the bottom. The top corner (302) is where air (e.g., pulled or pushed downward by a rotor, not shown) enters the wake. To help the air enter the wake and adhere to the side of the float (e.g., so that there is no separation between the float and the wake), the top corner is rounded.

In the middle section of the float's side (304), the side of the float slopes inward (at least in this example) so that the cross sectional area of the wake (e.g., as it flows down along the side of the float) expands. Conceptually speaking, this inward sloping "pulls out" the wake and widens the cross section of the wake. Generally speaking, the inwards slope (if any) is relatively slight or gradual, for example on the order of 0 to 7 degrees. (It is noted that the range of sloping includes 0 degrees and in some embodiments the side of a duct float is straight and does not slope inwards.) If the side of the float sloped inwards too quickly, then the wake might separate from the side of the float part of the way down. Ideally, the wake follows the side of the float all the way down to the bottom corner of the float.

At the bottom of the float's side (306), the float has (e.g., a relatively sharp) corner (e.g., with an angle of roughly 90 degrees). Having a corner at the bottom helps the wake separate from the float cleanly. Preferably, the wake continues its downward path after separating from the bottom corner of the float and does not (as an example) curve around the bottom corner to flow along the bottom surface of the float. A relatively sharp bottom corner may help with a clean separation.

In some embodiments, a variety of shapes are tested (e.g., using airborne, visible particles as described above) in order to optimize or more generally determine what float shape (e.g., cross section) to use.

In some embodiments, floats which were not originally designed to act like ducts are retrofitted so that they can be float ducts. The following figure describes one such example.

Figure 4:
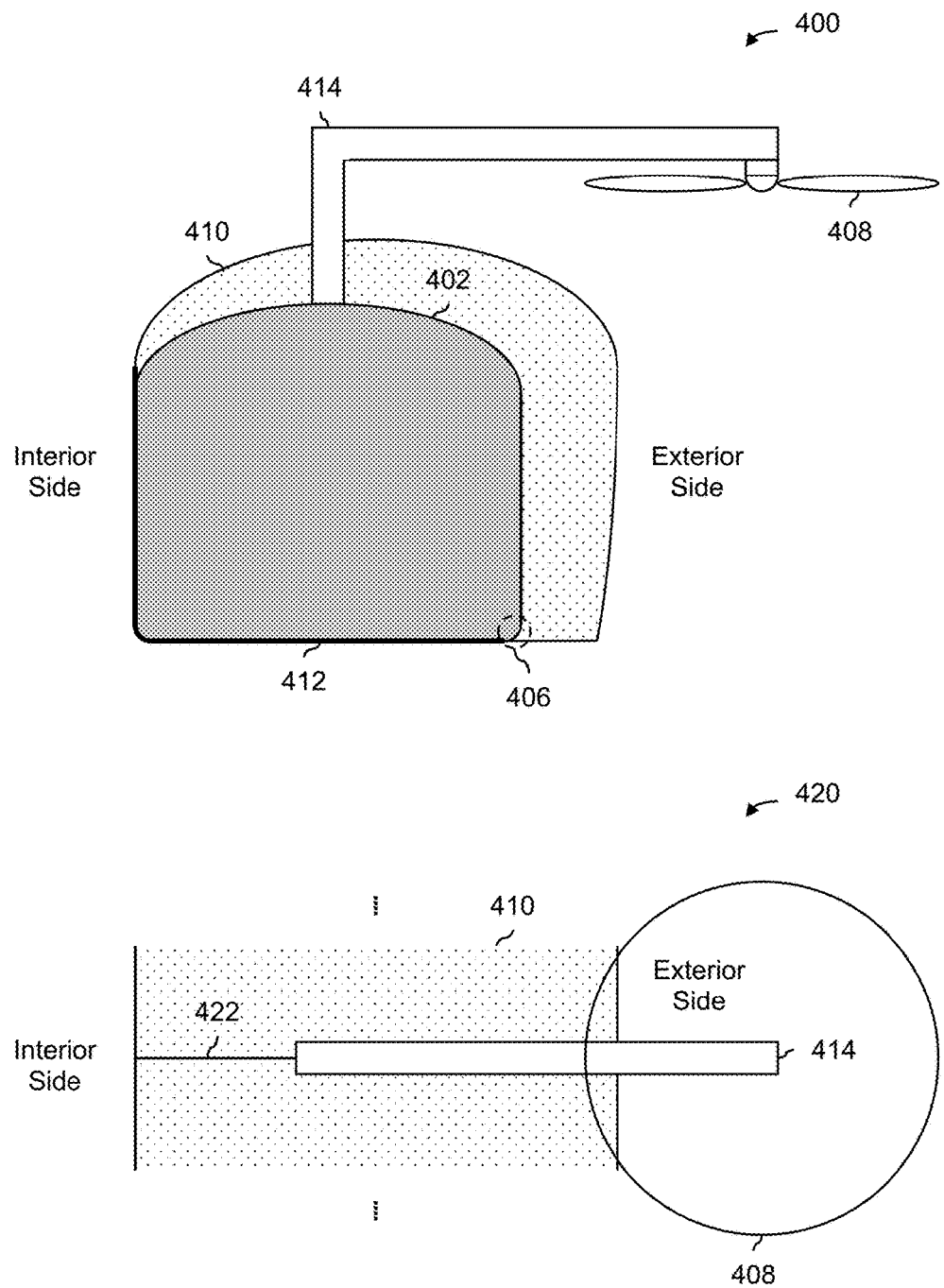
FIG. 4 is a diagram illustrating an embodiment of a retrofitted float duct.

FIG. 4 is a diagram illustrating an embodiment of a retrofitted float duct. Diagram 400 shows a cross sectional view of an original float (402) which was not originally designed to act like a duct. For example, the bottom corner of the original float (406) is too rounded. This makes it difficult for the wake to separate cleanly from the original float at that corner (e.g., some of the wake wraps around to the bottom of the original float instead of separating from the original float and continuing downward). Also, the horizontal overlap and vertical separation of the original float (404) and the rotor (408) are not within desired ranges for those values. This also prevents the original float from acting like a duct.

A float attachment (410) is used to retrofit the original float (402) so that the retrofitted duct (i.e., the float attachment and original float, together) is able to act like a duct. As cross sectional view 400 shows, one or more straps (412) secure the float attachment around the original float. For example, strap 412 may use Velcro or some sort of cinch to tighten the strap and secure the float attachment to the original float. Alternatively, the float attachment may be secured using some other technique, such as a stretchy or elastic sleeve which fits over or around the original float, an adhesive to glue the float attachment to the original float, etc.

Diagram 420 shows a partial top view of the arm (414) and float attachment (410). As shown from that view, the float attachment may include a slit (422) (i.e., a cut in the float attachment) so that the float attachment can be fitted around the arm (414). In some embodiments, a slit is sealable (e.g., (semi-)permanently using tape or glue or in a re-sealable manner with a zipper or Velcro). The slit (422) extends from the edge of the float attachment (on the interior side of the float) to an opening or cutout (not shown) for the arm (414) to fit through. In this example, the slit points toward the interior of the aircraft. In some embodiments this is describe because that part of the float minimally affects whether or not a duct effect is induced since the wake from the rotor flows past or near the part of the float attachment closer to the exterior of the aircraft, not the half closer to the interior. Placing the slit on that side of the float attachment will therefore not affect whether or not the float acts like a duct.

The retrofitted float (i.e., the original float in combination with the float attachment) now has a vertical separation and a horizontal overlap with the rotor which fall into appropriate or proper ranges to cause a duct effect. Also, the shape of the retrofitted float (e.g., having a cross section which resembles a loaf of bread) helps with the duct effect. Thus, a float which was not originally designed to act like a duct may be retrofitted to act like a duct.

In this particular example, the original float is widened on the exterior side, not the interior side. This may be useful in cases where the overwater aircraft has no open space on the interior side of the float (e.g., because that part of the aircraft is already filled with other components). Also, that part of the float has very little impact on whether or not the float acts like a duct and so there is little need to modify that portion of the float.

When an overwater aircraft is flying close to the water's surface, the wake from the rotors will be reflected back upward by the surface of the water. In some embodiments, an overwater air (e.g., which includes float ducts) may include some component to harness this reflected wake. The following figure describes one such embodiment.

Figure 5:
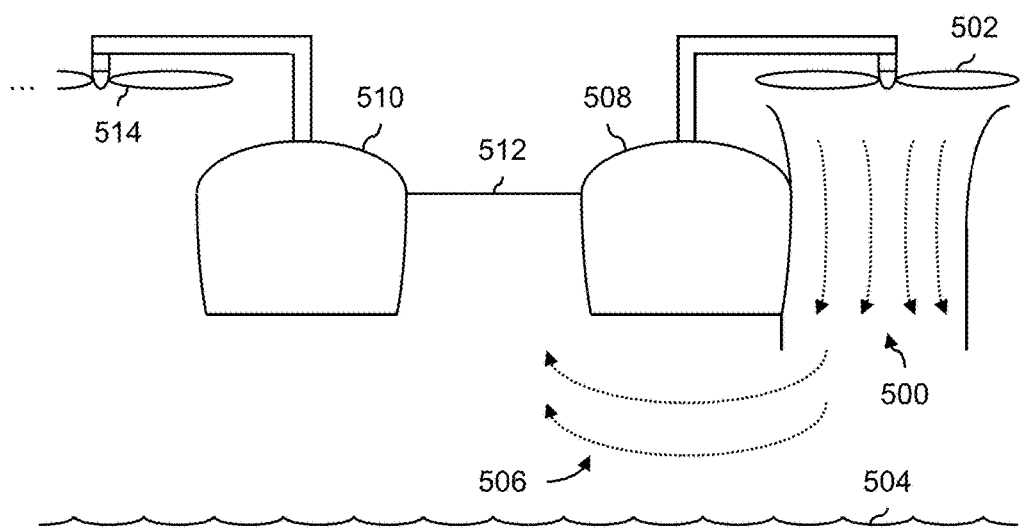
FIG. 5 is a diagram illustrating an embodiment of an overwater aircraft with float ducts and a floor panel to capture a reflected wake.

FIG. 5 is a diagram illustrating an embodiment of an overwater aircraft with float ducts and a floor panel to capture a reflected wake. In the example shown, a side view of the octocopter from FIG. 2 is shown. As described above, rotor 502 produces wake 500 which flows down and along the side of float 508. In this example, the overwater aircraft is flying relatively close to the surface of the water (In ground effect, less than one aircraft width from the water). This causes at least some of the air from wake 500 to bend or otherwise reflect off of the surface of the water (504). The reflected air (now flowing parallel to the surface of the water) then encounters other reflected wake (not shown) generated by the other rotor (514) and also bending or reflecting due to the surface of the water. This pushes reflected wake 506 upwards. A wake which bends or reflects off of the surface of the water is referred to herein as a reflected wake (506).

The reflected wake (506) is captured by a pocket or cavity created by float 508, float 510, and floor panel 512. In this example, the floor panel is positioned relatively high along the side of the floats (e.g., where the float starts to curve). If the floor panel (as an extreme counterexample) were instead connected to the bottom (corner) of the floats, then there would be no pocket and the reflect wake would not be captured. Therefore, a floor panel (generally speaking) is connected to a float closer to the top than to the bottom. The reflected wake captured by the pocket exerts an upward lifting force on the octocopter without the octocopter having to expend more power. This contributes to the efficiency of the system and is desirable.

In FIG. 2, in some embodiments, some panel or skirt extends across the top of the duct floats (shown for clarity as dashed line 550) and the bottom of the duct floats (shown for clarity as dashed line 552). Such panels or skirts may help to further capture the reflected wake (e.g., to prevent the reflected wake from escaping from the top/bottom).

Returning to FIG. 5, it is noted that reflected wake 506 is not the same thing as some wake which results from poor separation at the bottom corner of the float (e.g., where the air curves around the bottom corner of the float and reaches at least part of the bottom surface of the float). The reflected wake (506) does not curve around to the bottom corner of the float in order to get to the pocket created by the floats and the floor panel. Rather, the reflected wake bounces off of the surface of the water (which is a different path).

Although the exemplary floor panel (512) shown here is flat, a floor panel may be any shape which is sufficient to capture reflected air. For example, the underside of an overwater aircraft may be irregularly shaped because of aircraft components (e.g., a battery pack) and/or a cockpit or some open space where the pilot's legs are supposed to hang down. In some embodiments, a floor panel is irregularly shaped to accommodate the design of the aircraft. For example, the floor panel may be deeper (e.g., to better capture reflected air) where the design of the aircraft permits it and shallower elsewhere (e.g., where there is a battery pack, a cockpit, etc.).

As described above, an aircraft may be retrofitted to achieve some of the techniques or features described herein. The following figure describes an example where an aircraft is retrofitted to have float ducts and a floor panel to capture a reflected wake.

Figure 6:
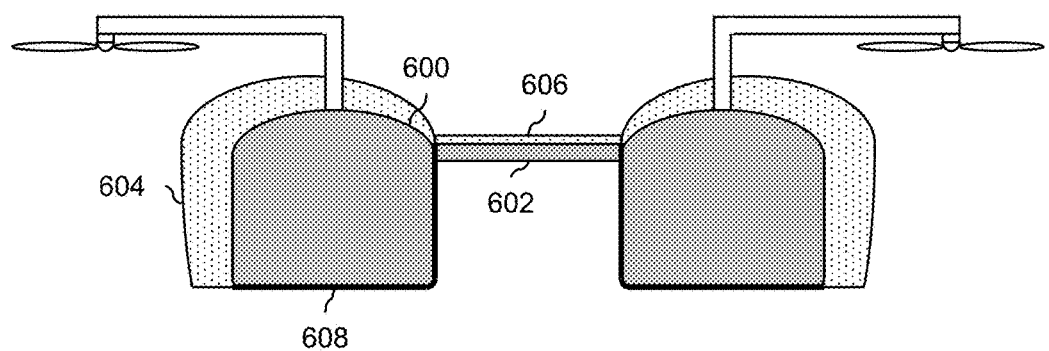
FIG. 6 is a diagram illustrating an embodiment of an octocopter retrofitted to have float ducts and a floor panel to capture a reflected wake.

FIG. 6 is a diagram illustrating an embodiment of an octocopter retrofitted to have float ducts and a floor panel to capture a reflected wake. In this example, the aircraft being retrofitted is the octocopter from FIG. 2. From this side view, the original floats (600) and crossbeam (602) of the octocopter can be seen.

To retrofit the octocopter, an attachment is secured to the octocopter. In this example, the attachment includes two float attachments (604) (e.g., one for each original float), a floor panel attachment (606) which is connected between the two float attachments, and one or more straps (608). As described above, the float attachments (604) modify the original floats so that they can act like ducts.

The floor panel attachment (606) creates a (e.g., sealed) pocket or cavity to capture air reflected off the surface of water. In this example, the bottom of the original octocopter (e.g., without the floor panel attachment) is not sealed off or covered so reflected air would simply pass through the octocopter without being captured and providing additional lift. To rectify this, the floor panel attachment seals off the bottom of the octocopter so that air reflected from the surface of the water can be captured for additional (and free) lift.

As described above, an attachment may include any number of slits, cutouts, or other design features to make fitting the attachment around and/or over parts of the aircraft easier. For example, it may be difficult to fit a floor panel attachment over and/or around a seat (or cockpit) because the seat (cockpit) protrudes from the top of the aircraft and/or has an awkward shape. In some embodiments, the floor panel attachment includes sealable slits (e.g., which may be sealed with Velcro strips, a more permanent adhesive such as glue, etc.) so that the floor panel attachment can be fitted over a seat (cockpit) and then the slits can be sealed to capture any reflected wake. In some embodiments, a floor panel attachment has multiple panels or pieces which may be connected together using any appropriate technique (e.g., Velcro strips, glue, etc.).

The attachment shown here is merely exemplary and the design of any attachment depends heavily upon the design of the aircraft being retrofitted. For example, although this example shows the floor panel attachment connected to the float attachments, in some embodiments, the two types of attachments are separate. For example, if the best place to put the floor panel attachment for a particular aircraft is on the underside of the aircraft (e.g., where the float attachment does not necessarily extend to), then the floor panel attachment may be separate from the float attachments.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An aircraft, comprising:
   a first float which provides buoyancy when the aircraft floats on a surface of water, wherein the first float includes:
   a planar bottom surface; and
   a side surface that is inwardly sloping within a range of 0 to 7 degrees, inclusive, for at least some part of the side surface;
   an unshielded rotor, wherein:
   the unshielded rotor is configured to rotate in a horizontal plane and blow a wake across a side of the first float; and
   the unshielded rotor and the first float are positioned relative to each other such that there is no aerodynamic separation between the wake blown by the unshielded rotor and the side of the first float;
   an arm configured to hold the unshielded rotor such that the unshielded rotor and the first float overlap in a horizontal direction and the unshielded rotor and the first float have a separation in a vertical direction, wherein the unshielded rotor is a downward-facing, unshielded rotor where a portion of the arm that extends horizontally outward from the aircraft is above the unshielded rotor; and
   a floor panel configured to form a pocket which captures a reflected wake after the wake is reflected off of the surface of the water, wherein the first float, a second float, and the floor panel are coupled such that a first side wall of the pocket includes the first float, a second side wall of the pocket includes the second float, and a ceiling of the pocket includes the floor panel.

2. The aircraft recited in claim 1, wherein the unshielded rotor is connected to the arm at a fixed position and the aircraft maneuvers by adjusting a rotational speed of the unshielded rotor.

3. The aircraft recited in claim 1, wherein the side of the first float across which the wake is blown includes one or more of the following:
   a concave portion across which the wake is blown or a convex portion across which the wake is blown.

4. The aircraft recited in claim 1, wherein:
   The first float includes an original float and a float attachment; and
   the wake is blown across the side of the float attachment.

5. The aircraft recited in claim 1, wherein:
   the first float includes an original float and a float attachment;
   the wake is blown across the side of the float attachment; and
   the original float and the unshielded rotor do not overlap in a horizontal direction.

6. The aircraft recited in claim 1, wherein:
   the first float includes an original float and a float attachment;
   the wake is blown across the side of the float attachment; and
   the float attachment includes a slit which points toward an interior of the aircraft.

7. The aircraft recited in claim 1, wherein:
   the floor panel is a floor panel attachment which is connected to a float attachment;
   the first float includes an original float and the float attachment; and
   the wake is blown across the side of the float attachment.

8. The aircraft recited in claim 1, wherein:
   the floor panel is a floor panel attachment which is connected to a float attachment;
   the first float includes an original float and the float attachment;
   the wake is blown across the side of the float attachment; and
   the original float and the unshielded rotor do not overlap in the horizontal direction.

9. The aircraft recited in claim 1, wherein:
   the floor panel is a floor panel attachment which is connected to a float attachment;
   the first float includes an original float and the float attachment;
   the wake is blown across the side of the float attachment; and
   the float attachment includes a slit which points toward an interior of the aircraft.

* * * * *